(12) United States Patent
Nam (10) Patent No.: US 12,100,187 B2
(45) Date of Patent: Sep. 24, 2024

(54) METHOD AND SYSTEM FOR ESTIMATING INTERACTION INFORMATION BETWEEN PERSON AND PRODUCT ON BASIS OF IMAGE, AND NON-TRANSITORY COMPUTER-READABLE RECORDING MEDIUM

(71) Applicant: MAY-I INC., Seoul (KR)

(72) Inventor: Gil Hyun Nam, Seoul (KR)

(73) Assignee: MAY-I INC., Seoul (KR)

( * ) Notice: Subject to any disclaimer, the term of this patent is extended or adjusted under 35 U.S.C. 154(b) by 144 days.

(21) Appl. No.: 17/912,118

(22) PCT Filed: Oct. 5, 2020

(86) PCT No.: PCT/KR2020/013507
§ 371 (c)(1),
(2) Date: Nov. 8, 2022

(87) PCT Pub. No.: WO2021/187701
PCT Pub. Date: Sep. 23, 2021

(65) Prior Publication Data
US 2023/0133882 A1  May 4, 2023

(30) Foreign Application Priority Data
Mar. 19, 2020 (KR) .................. 10-2020-0033634

(51) Int. Cl.
| H04N 7/18 | (2006.01) |
|---|---|
| G06T 7/70 | (2017.01) |
| G06V 10/10 | (2022.01) |
| G06V 10/75 | (2022.01) |
| G06V 40/20 | (2022.01) |

(52) U.S. Cl.
CPC ............... *G06V 10/10* (2022.01); *G06T 7/70* (2017.01); *G06V 10/751* (2022.01); *G06V 40/28* (2022.01); *G06T 2207/30196* (2013.01); *G06V 2201/07* (2022.01)

(58) Field of Classification Search
CPC ...... G06V 10/10; G06V 40/28; G06V 10/751; G06V 2201/07; G06T 7/70; G06T 2207/30196; H04N 7/18
USPC .......................................................... 348/77
See application file for complete search history.

(56) References Cited

U.S. PATENT DOCUMENTS

| 9,977,970 B2 * | 5/2018 | Loce ...................... G06V 20/52 |
| 11,003,901 B2 * | 5/2021 | Boyer .................... G06V 10/40 |
| 11,107,114 B2 * | 8/2021 | Burris .................. G05D 1/0088 |

(Continued)

FOREIGN PATENT DOCUMENTS

| JP | 2009048430 A | 3/2009 | |
| JP | 4972491 B2 * | 7/2012 | ............ G06Q 30/02 |
| KR | 101490505 B1 | 2/2015 | |

*Primary Examiner* — Trang U Tran
(74) *Attorney, Agent, or Firm* — Dinsmore & Shohl LLP; Yongsok Choi, Esq.

(57) ABSTRACT

An interaction information estimation method is provided. The method includes the steps of: determining, on the basis of a relationship between a product region and a first person detected in a plurality of video frames, whether contact is made between the first person and a product included in the product region, thereby estimating information on an interaction between the first person and the product on the basis of a result of the determination; and validating the estimated information on the interaction.

9 Claims, 7 Drawing Sheets

(56) References Cited

U.S. PATENT DOCUMENTS 11,481,805 B2* 10/2022 Glaser ................ G06Q 30/0275
2019/0205933 A1 7/2019 Glaser et al.

* cited by examiner

METHOD AND SYSTEM FOR ESTIMATING INTERACTION INFORMATION BETWEEN PERSON AND PRODUCT ON BASIS OF IMAGE, AND NON-TRANSITORY COMPUTER-READABLE RECORDING MEDIUM

CROSS-REFERENCE TO RELATED APPLICATION (S)

This application is a continuation application of Patent Cooperation Treaty (PCT) International Application No. PCT/KR2020/013507 filed on Oct. 5, 2020, which claims priority to Korean Patent Application No. 10-2020-0033634 filed on Mar. 19, 2020. The entire contents of PCT International Application No. PCT/KR2020/013507 and Korean Patent Application No. 10-2020-0033634 are hereby incorporated by reference.

FIELD OF THE INVENTION

The present invention relates to a method, system, and non-transitory computer-readable recording medium for estimating information on an interaction between a person and a product on the basis of a video.

BACKGROUND

With the development of video analysis technology using artificial intelligence in recent years, there is a growing demand for techniques for analyzing videos captured in an offline market to collect information on how much consumers are interested in certain products, and supporting the use of such information in establishing strategies for marketing, sales, and the like.

Information on how much a consumer is interested in a certain product may be considered with great importance in establishing a strategy for marketing, sales, or the like of the product. However, although it is easy to collect such information in an online market, it is difficult to collect such information in an offline market except for a purchase record of the consumer.

As an example of related conventional techniques, Korean Registered Patent Publication No. 1490505 discloses a technique employing a first body state index generation module configured to analyze, from a video containing an object received from a camera, first body state information related to an eye of the object with reference to a first reference body state index related to the eye, and generate a first body state index of the object on the basis of a result of the analysis; a second body state e index generation module configured to analyze second body state information related to a facial feature of the object with reference to a second reference body state index related to the facial feature, and generate a second body state index of the object on the basis of a result of the analysis; a third body state index generation module configured to analyze third body state information related to a facial direction of the object with reference to a third reference body state index related to the facial direction, and generate a third body state index of the object on the basis of a result of the analysis; and a target attention index generation module configured to generate a target attention index related to a degree of interest of the object in a target observed by the object from at least one of the first to third body state indexes.

However, according to the techniques introduced so far as well as the above-described conventional technique, it is not possible to accurately determine, for example, whether a person contacts a specific shelf or a product included in the shelf on the basis of a video captured in an offline market.

In this connection, the inventor (s) present a technique for estimating information on an interaction between a person and a product on the basis of a video captured in an offline market.

SUMMARY OF THE INVENTION

One object of the present invention is to solve all the above-described problems in prior art.

Another object of the invention is to determine, on the basis of a relationship between a product region and a first person detected in a plurality of video frames, whether contact is made between the first person and a product included in the product region, thereby estimating information on an interaction between the first person and the product on the basis of a result of the determination, and to validate the estimated information on the interaction.

The representative configurations of the invention to achieve the above objects are described below.

According to one aspect of the invention, there is provided a method comprising the steps of: determining, on the basis of a relationship between a product region and a first person detected in a plurality of video frames, whether contact is made between the first person and a product included in the product region, thereby estimating information on an interaction between the first person and the product on the basis of a result of the determination; and validating the estimated information on the interaction.

According to another aspect of the invention, there is provided a system comprising: an interaction information estimation unit configured to determine, on the basis of a relationship between a product region and a first person detected in a plurality of video frames, whether contact is made between the first person and a product included in the product region, thereby estimating information on an interaction between the first person and the product on the basis of a result of the determination; and a validation unit configured to validate the estimated information on the interaction.

In addition, there are further provided other methods and systems to implement the invention, as well as non-transitory computer-readable recording media having stored thereon computer programs for executing the methods.

According to the invention, it is possible to accurately determine, for example, whether a person contacts a specific shelf or a product included in the shelf in an offline market by determining, on the basis of a relationship between a product region and a first person detected in a plurality of video frames, whether contact is made between the first person and a product included in the product region, thereby estimating information on an interaction between the first person and the product on the basis of a result of the determination, and validating the estimated information on the interaction.

According to the invention, it is possible to quantify behavior of consumers in an offline market and use the quantified behavior as a reference index in a funnel analysis or the like to support establishment of a strategy for marketing, sales, or the like.

According to the invention, it is possible to efficiently utilize limited computing resources and process a video in real time because the amount of calculation is much smaller than when whether contact is made between a person and a product is determined on the basis of action recognition using an artificial neural network.

According to the invention, it is possible to determine whether contact is made between a person and a product without referring to depth information on a plurality of video frames, so that information on an interaction between the person and the product may be estimated in a fast and cost-effective manner.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

Figure 1:
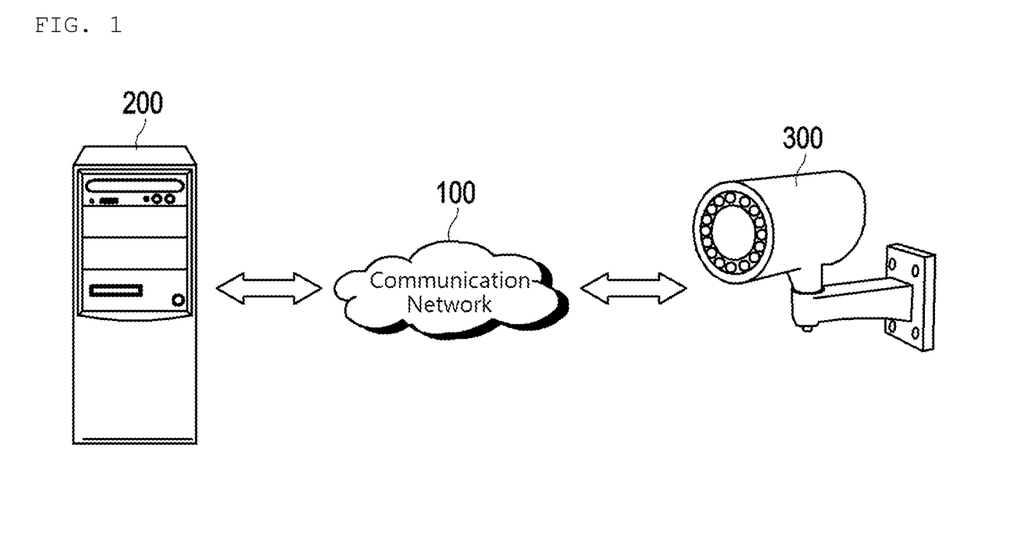
FIG. 1 schematically shows the configuration of an entire system for estimating information on an interaction between a person and a product on the basis of a video according to one embodiment of the invention.

FIG. 1 schematically shows the configuration of the entire system for estimating information on an interaction between a person and a product on the basis of a video according to one embodiment of the invention.

As shown in FIG. 1, the entire system according to one embodiment of the invention may comprise a communication network 100, an interaction information estimation system 200, and a video capture module 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the interaction information estimation system 200 according to one embodiment of the invention may function to determine, on the basis of a relationship between a product region and a first person detected in a plurality of video frames, whether contact is made between the first person and a product included in the product region, thereby estimating information on an interaction between the first person and the product on the basis of a result of the determination, and to validate the estimated information on the interaction.

The configuration and functions of the interaction information estimation system 200 according to the invention will be discussed in more detail below.

Next, the video capture module 300 according to one embodiment of the invention is equipment capable of connecting to and then communicating with the interaction information estimation system 200, and capable of capturing a video, and may include, but is not limited to, a CCTV, an IP camera, and the like. Further, the video capture module 300 according to one embodiment of the invention may encompass a recorder (e.g., a digital video recorder (DVR) or a network video recorder (NVR)) for storing a video captured by the CCTV, the IP camera, and the like.

Configuration of the Interaction Information Estimation System

Hereinafter, the internal configuration of the interaction information estimation system 200 crucial for implementing the invention and the functions of the respective components thereof will be discussed.

Figure 2:
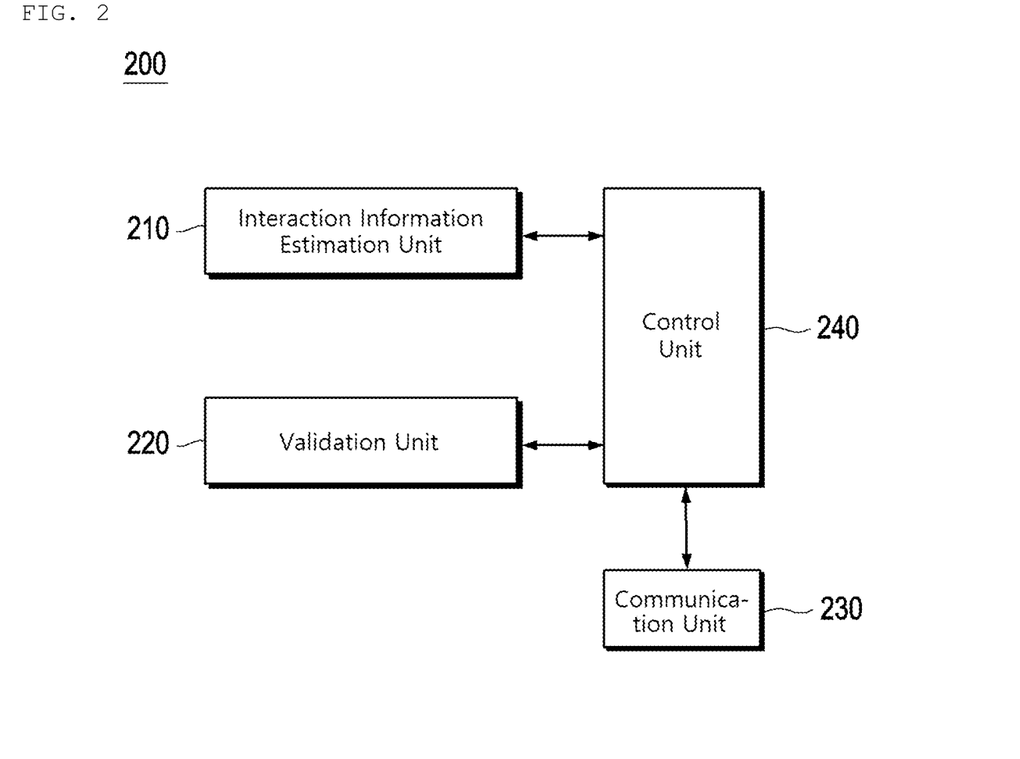
FIG. 2 specifically shows the internal configuration of an interaction information estimation system according to one embodiment of the invention.

FIG. 2 specifically shows the internal configuration of the interaction information estimation system 200 according to one embodiment of the invention.

As shown in FIG. 2, the interaction information estimation system 200 according to one embodiment of the invention may comprise an interaction information estimation unit 210, a validation unit 220, a communication unit 230, and a control unit 240. According to one embodiment of the invention, at least some of the interaction information estimation unit 210, the validation unit 220, the communication unit 230, and the control unit 240 may be program modules to communicate with an external system. The program modules may be included in the interaction information estimation system 200 in the form of operating systems, application program modules, or other program modules, while they may be physically stored in a variety of commonly known storage devices. Further, the program modules may also be stored in a remote storage device that may communicate with the interaction information estimation system 200. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the interaction information estimation system 200 has been described as above, and it will be apparent to those skilled in the art that at least a part of the components or functions of the interaction information estimation system 200 may be implemented or included in an external system (not shown) or an external device (not shown), as necessary.

First, the interaction information estimation unit 210 according to one embodiment of the invention may function to determine, on the basis of a relationship between a product region and a first person detected in a plurality of video frames, whether contact is made between the first person and a product included in the product region.

Specifically, when a video is captured by the video capture module 300 according to one embodiment of the invention, the interaction information estimation unit 210 according to one embodiment of the invention may detect a first person in each of a plurality of video frames included in the captured video. Here, the detected first person may refer to at least one of a boundary region surrounding at least a part of the detected first person (e.g., a bounding box for the entire body of the first person or a bounding box for the head of the first person), at least one feature point estimated from a pose of the detected first person (e.g., major joint points of the first person), and a connection line connecting the at least one feature point. Further, the interaction information estimation unit 210 according to one embodiment of the invention may detect the first person using a CenterNet-based keypoint estimation algorithm, a variety of known algorithms related to pose estimation, and the like. Furthermore, the interaction information estimation unit 210 according to one embodiment of the invention may use a Kalman filter-based object tracking algorithm to track the detected first person in the plurality of video frames, and may assign an identification code to the tracked first person. However, the algorithms used for detecting and tracking the first person according to one embodiment of the invention are not limited to those listed above, and may be diversely changed as long as the objects of the invention may be achieved.

Meanwhile, the product region according to one embodiment of the invention may refer to a region in which products are displayed on a shelf arranged in an offline market. Further, the product region according to one embodiment of the invention may be divided by each tier when the shelf has multiple tiers, and may be subdivided by type of product even on the same tier. In addition, the interaction information estimation unit 210 according to one embodiment of the invention may detect the product region using a known algorithm for object detection. However, since the video capture module 300 installed in the offline market is fixed at the installed position in general, the product region may be preset in order to save computing resources. Of course, it is also possible that a product region is preset for each tier of the shelf and the interaction information estimation unit 210 according to one embodiment of the invention uses a known algorithm for object detection to detect a subdivided region (e.g., a region subdivided by type of product) included in the preset product region. However, the methods for setting the product region according to one embodiment of the invention are not limited to those listed above, and may be diversely changed as long as the objects of the invention may be achieved.

Meanwhile, the relationship between the product region and the first person detected in the plurality of video frames, on the basis of which the interaction information estimation unit 210 according to one embodiment of the invention determines whether contact is made between the first person and a product included in the product region, may refer to a relationship indicating that at least a part of the detected first person overlaps the product region.

Specifically, when at least one of a boundary region surrounding at least a part of the first person detected in the plurality of video frames by the interaction information estimation unit 210 according to one embodiment of the invention, at least one feature point estimated from a pose of the detected first person, and a connection line connecting the at least one feature point overlaps the product region at or above a predetermined level, the interaction information estimation unit 210 according to one embodiment of the invention may determine that contact is made between the first person and a product included in the product region.

Further, the interaction information estimation unit 210 according to one embodiment of the invention may estimate a position of the hand of the first person detected in the plurality of video frames by the interaction information estimation unit 210 according to one embodiment of the invention from at least one of at least one feature point estimated from a pose of the detected first person, and a connection line connecting the at least one feature point, and may determine that contact is made between the first person and a product included in the product region when the estimated position of the hand is included in the product region. In addition, according to one embodiment of the invention, the wrist and elbow of the first person may be estimated from the pose of the detected first person, and a point that externally divides the estimated elbow and wrist in a ratio of 3:1 may be estimated to be the position of the first person's hand. However, the method of estimating the position of the first person's hand according to one embodiment of the invention is not limited thereto, and may be diversely changed as long as the objects of the invention may be achieved.

Meanwhile, the interaction information estimation unit 210 according to one embodiment of the invention may determine whether contact is made between the first person and a product included in the product region without referring to depth information on the plurality of video frames. That is, the interaction information estimation unit 210 according to one embodiment of the invention may determine whether the contact is made only on the basis of a relationship between the product region and the first person detected in a plurality of video frames of a two-dimensional video, rather than estimate depth information using a three-dimensional video containing the depth information or from a plurality of video frames of a two-dimensional video, and determine whether the contact is made with reference to the estimated depth information. Thus, according to one embodiment of the invention, whether the contact is made is determined using a two-dimensional video as described above, so that a common RGB camera rather than an expensive depth camera may also be employed. Further, although the process of estimating depth information from a plurality of video frames of a two-dimensional video requires a large amount of computation, this process is not performed according to one embodiment of the invention, so that the number of video frames that can be processed per second is much greater than when the above process is performed.

Figure 3:
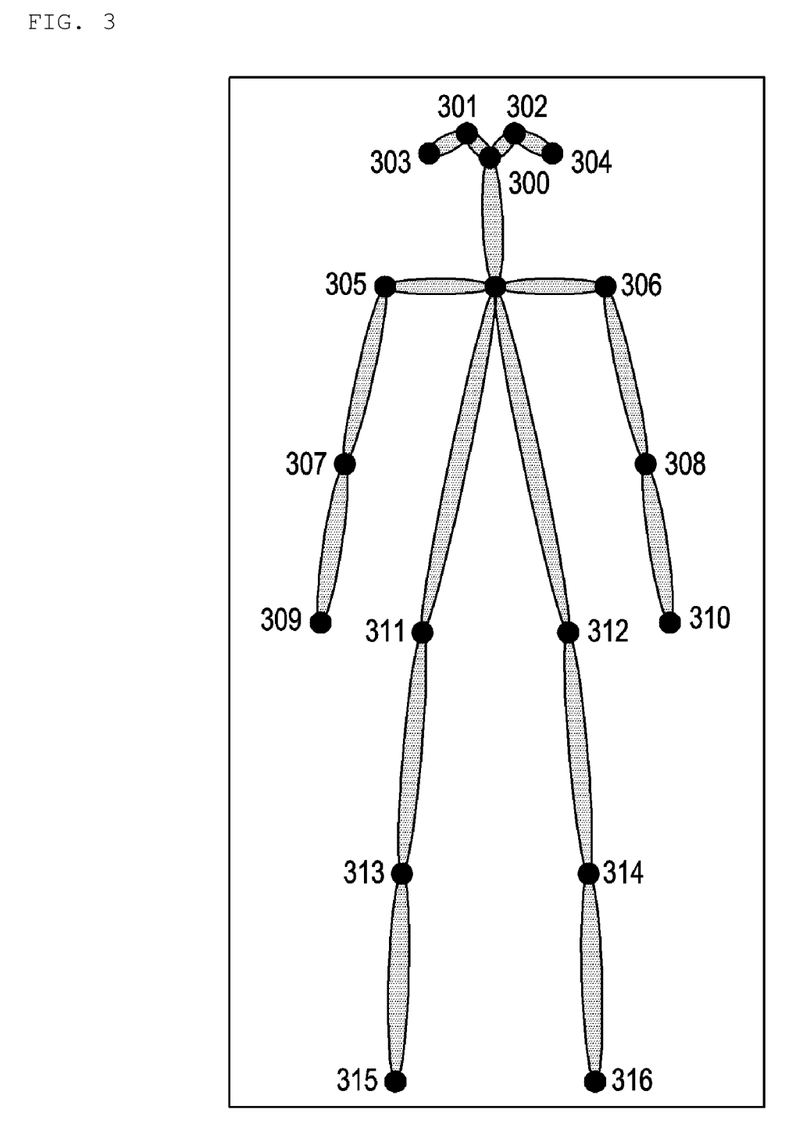
FIG. 3 illustratively shows a first person detected in a video frame according to one embodiment of the invention.
Figure 4:
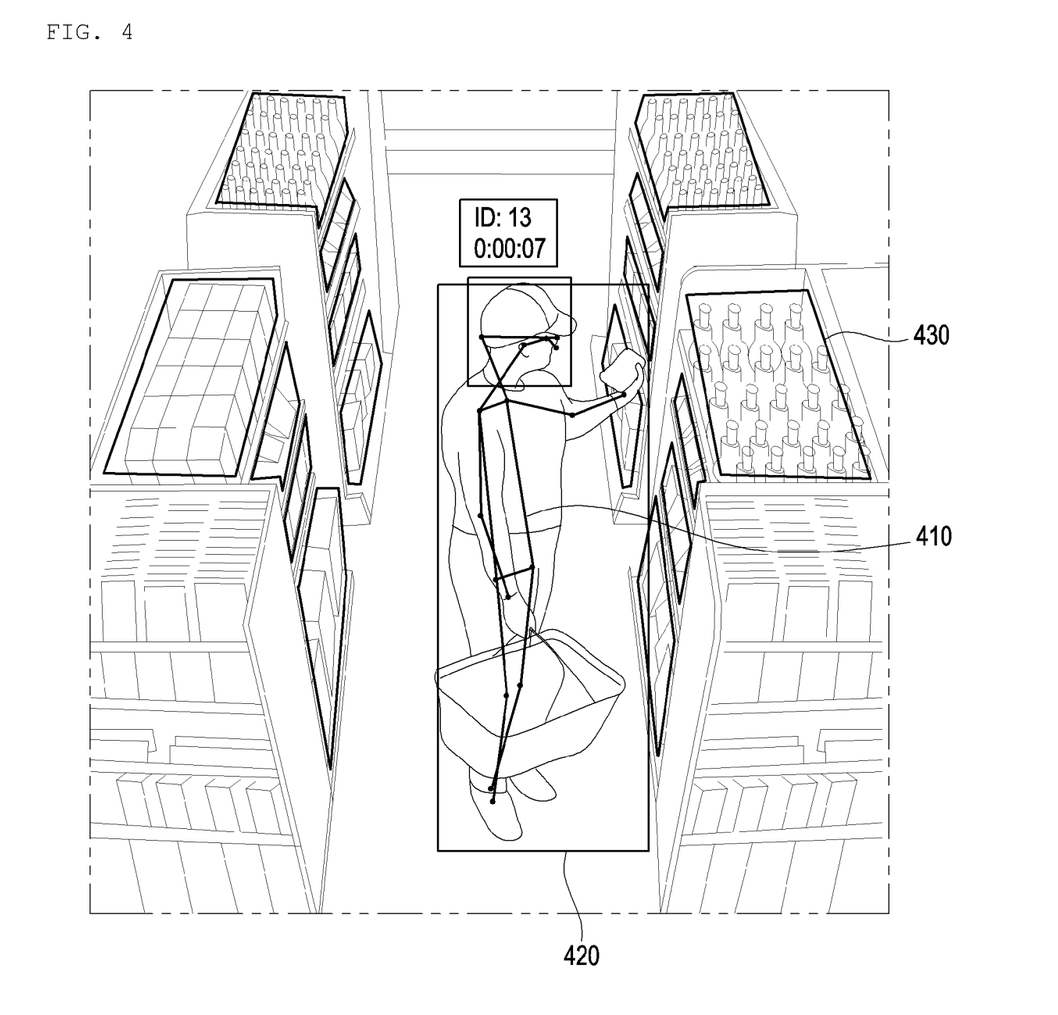
FIG. 4 illustratively shows a product region and a first person detected in a video frame according to one embodiment of the invention.

FIGS. 3 and 4 illustratively show a product region and a first person detected in a video frame according to one embodiment of the invention.

Referring to FIG. 3, 17 major joint points 300 to 316 estimated from a pose of the first person detected in the video frame by the interaction information estimation unit 210 according to one embodiment of the invention and connection lines connecting the joint points are illustrated. Here, 307 and 308 denote the elbows of the first person, and 309 and 310 denote the wrists of the first person.

Further, referring to FIG. 4, a first person 410, 420 and a product region 430 detected in the video frame by the interaction information estimation unit 210 according to one embodiment of the invention are illustrated.

Meanwhile, when it is determined as described above whether contact is made between the first person and a product included in the product region, there may be a case where it is determined that the first person contacts the product even though the first person does not contact the product, such as a case where a position of the first person's hand is included in the product region while no contact is made between the first person and the product. Thus, a process of filtering such a case of erroneous determination is required, and the validation unit 220 performing a function related thereto will be described later.

Meanwhile, when it is determined by the interaction information estimation unit 210 according to one embodiment of the invention whether contact is made between the first person and a product included in the product region, the interaction information estimation unit 210 according to one embodiment of the invention may function to estimate information on an interaction between the first person and the product on the basis of a result of the determination.

Specifically, the information on the interaction according to one embodiment of the invention may refer to information on how long a person has contacted a certain product. Thus, the information on the interaction between the first person and the product included in the product region, which is estimated by the interaction information estimation unit 210 according to one embodiment of the invention, may include an identification code of the first person, an identification code of the product region (or an identification code of the product included in the product region), information on a first video frame in which a relationship between the first person and the product region begins, information on a second video frame in which the relationship ends, and the like. Meanwhile, the information on the second video frame may be expressed in the format of the number of video frames between the first video frame and the second video frame, the number of frames in which the above relationship is maintained, and the like.

Further, the interaction information estimation unit 210 according to one embodiment of the invention may determine the first video frame as a frame in which the first person detected in the plurality of video frames, or the position of the first person's hand estimated from the detected first person, begins to overlap the product region, and determine the second video frame as a frame in which the detected first person or the position of the first person's hand estimated from the detected first person begins to not overlap the product region. However, the method of determining the first video frame and the second video frame according to one embodiment of the invention is not limited thereto, and may be diversely changed as long as the objects of the invention may be achieved.

Meanwhile, in an offline market, there may be a case where it is not possible to capture a body part of the first person because the first person's body part is hidden by another person or object, or due to a positional relationship between the first person and the video capture module 300 installed in the market. In this case, the first person may not be continuously detected by the interaction information estimation unit 210 according to one embodiment of the invention, and thus the information on the interaction between the first person and the product included in the product region may be estimated as divided into two or more pieces. The interaction information estimation unit 210 according to one embodiment of the invention may merge the two or more divided pieces of the interaction information into one piece of the interaction information, thereby accurately estimating a duration for which the relationship between the first person and the product region is maintained.

For example, it may be assumed that the information on the interaction between the first person and the product included in the product region, which is estimated by the interaction information estimation unit 210 according to one embodiment of the invention, is expressed in a data format such as [contact_start_frame, duration_frame, person_id, contacted_shelf_id]. Here, contact_start_frame may denote the number of the first video frame in which the relationship between the first person and the product region begins, duration_frame may denote the number of frames in which the relationship is maintained, person_id may denote the identification code of the first person, and contacted_shelf_id may denote the identification code of the product region.

Continuing the example, it may be assumed the relationship between the first person and the product region actually begins in a video frame #30 and ends in a video frame #96 (i.e., the relationship is maintained for 3.2 seconds with respect to a 30 fps video), while the interaction information estimated by the interaction information estimation unit 210 according to one embodiment of the invention is divided into first interaction information having data of [30, 36, 1, 2] and second interaction information having data of [70, 27, 1, 2]. Further, assuming that a video frame section corresponding to the first interaction information is a preceding section (i.e., a section of the video frame #30 to a video frame #65), and a video frame section corresponding to the second interaction information is a trailing section (i.e., a section of a video frame #70 to the video frame #96), the interaction information estimation unit 210 according to one embodiment of the invention may determine whether the number of video frames between the video frame #65 (which finishes the preceding section) and the video frame #70 (which starts the trailing section) is not greater than a predetermined level. Further, when it is determined that the number of frames is not greater than the predetermined level, the first interaction information and the second interaction information may be merged to generate interaction information having data of [30, 67, 1, 2].

Meanwhile, although the case where there are two pieces of the interaction information estimated by the interaction information estimation unit 210 according to one embodiment of the invention has been described above, it will be apparent to those skilled in the art that three or more pieces of the interaction information may be merged in the same manner, and thus a detailed description thereof will be omitted.

Next, when the information on the interaction between the first person and the product included in the product region is estimated by the interaction information estimation unit 210 according to one embodiment of the invention, the validation unit according to one embodiment of the invention may function to validate the estimated information on the interaction.

Specifically, the validation unit 220 according to one embodiment of the invention may validate the estimated information on the interaction in order to filter interaction information corresponding to a case where no contact is made between the first person and the product included in the product region, among the information on the interaction estimated by the interaction information estimation unit 210.

More specifically, the validation unit 220 according to one embodiment of the invention may validate the information on the interaction estimated by the interaction information estimation unit 210 according to one embodiment of the invention, with reference to at least one of the number of video frames between a first video frame in which a relationship between the first person and the product region begins and a second video frame in which the relationship ends, and a pixel value change between a third video frame temporally preceding the first video frame and a fourth video frame temporally trailing the second video frame.

For example, according to one embodiment of the invention, it may be assumed that the number of video frames between the first video frame in which the relationship between the first person and the product region begins and the second video frame in which the relationship ends is not greater than a predetermined minimum value or not less than a predetermined maximum value. In this case, it is highly probable that no contact is made between the first person and the product included in the product region, or rather the first person passes by the product region or stays looking at another location irrelevant to the product region. Thus, the validation unit 220 according to one embodiment of the invention may determine that the information on the interaction estimated by the interaction information estimation unit 210 according to one embodiment of the invention is not valid.

Meanwhile, when the first person actually contacts the product included in the product region (e.g., when the first person picks up and puts down the product, or carries away the product), the product region in a video frame before the contact is different from the product region in a video frame after the contact. Therefore, assuming that the video frame before the contact is the third video frame and the video frame after the contact is the fourth video frame, the validation unit 220 according to one embodiment of the invention may calculate a pixel value change of the product region by comparing the product region in the third video frame and the product region in the fourth video frame. Further, when the pixel value change does not meet a predetermined level, it is highly probable that no contact is made between the first person and the product, and thus the validation unit 220 according to one embodiment of the invention may determine that the information on the interaction estimated by the interaction information estimation unit 210 according to one embodiment of the invention is not valid.

Meanwhile, the third video frame according to one embodiment of the invention may refer to, among the video frames temporally preceding the first video frame in which the relationship between the first person and the product region begins, a video frame in which the product region is not hidden by a second person or another object and which is temporally closest to the first video frame. Further, the fourth video frame according to one embodiment of the invention may refer to, among the video frames temporally trailing the second video frame in which the relationship between the first person and the product region ends, a video frame in which the product region is not hidden by the second person or other object and which is temporally closest to the second video frame. In addition, whether the product region is hidden by the second person or other object may be determined by detecting the second person or other object by the interaction information estimation unit 210 according to one embodiment of the invention.

Further, according to one embodiment of the invention, whether the pixel value change of the product region calculated by comparing the product region in the third video frame and the product region in the fourth video frame does not meet the predetermined level may be determined with reference to at least one of three variables $R_{cn}$, $R_{cv}$ and $\text{Diff}_{max}$ as below.

$R_{cn}$ (Ratio of changed pixel number)=the number of pixels whose pixel values are changed among pixels included in the product region divided by the number of the pixels included in the product region $R_{cv}$ (Ratio of changed pixel value)=the sum of a pixel value change of each of the pixels included in the product region divided by the number of the pixels included in the product region $\text{Diff}_{max}$=the pixel value change of the pixel whose pixel value change is the greatest among the pixels included in the product region According to one embodiment of the invention, the pixel whose pixel value is changed in $R_{cn}$ may refer to a pixel whose pixel value in any one of R, G and B channels is changed at or above a predetermined level. When the value of $R_{cn}$ is not greater than a predetermined minimum value or not less than a predetermined maximum value, it is highly probable that no contact is made between the first person and the product included in the product region, and thus the validation unit 220 according to one embodiment of the invention may determine that the information on the interaction estimated by the interaction information estimation unit 210 according to one embodiment of the invention is not valid.

Further, according to one embodiment of the invention, the pixel value change in $R_{cv}$ and $\text{Diff}_{max}$ may refer to the sum of pixel value changes in R, G and B channels of the corresponding pixel. When the value of $R_{cv}$ is not greater than a predetermined minimum value or not less than a predetermined maximum value, or when the value of $Diff_{max}$ is not greater than a predetermined minimum value, it is highly probable that no contact is made between the first person and the product included in the product region, and thus the validation unit 220 according to one embodiment of the invention may determine that the information on the interaction estimated by the interaction information estimation unit 210 according to one embodiment of the invention is not valid.

Meanwhile, the process of validating the interaction information by the validation unit 220 according to one embodiment of the invention has been described above in terms of specific embodiments and variables, the embodiments and variables may be diversely changed as long as the objects of the invention may be achieved. In particular, the predetermined maximum values and minimum values described above may be differently set for each product region, and may be differently set depending on the type, installation position, installation angle, and the like of the video capture module 300.

FIGS. 5A to 8 illustratively show how information on an interaction between a person and a product is estimated and the estimated information on the interaction is validated according to one embodiment of the invention.

Figure 5A:
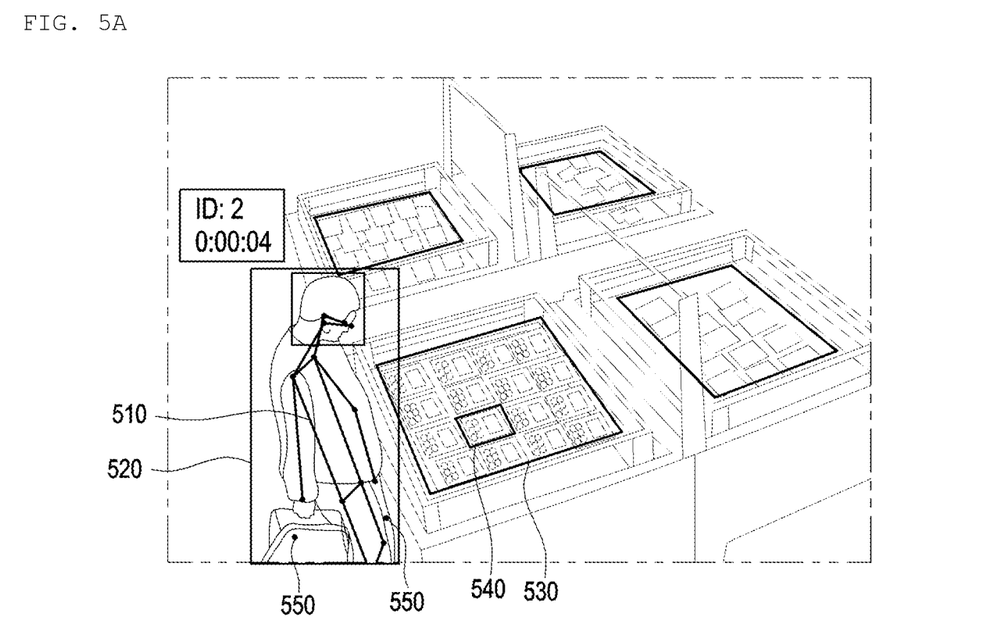
FIG. 5A illustratively shows how information on an interaction between a person and a product is estimated and the estimated information on the interaction is validated according to one embodiment of the invention.
Figure 5B:
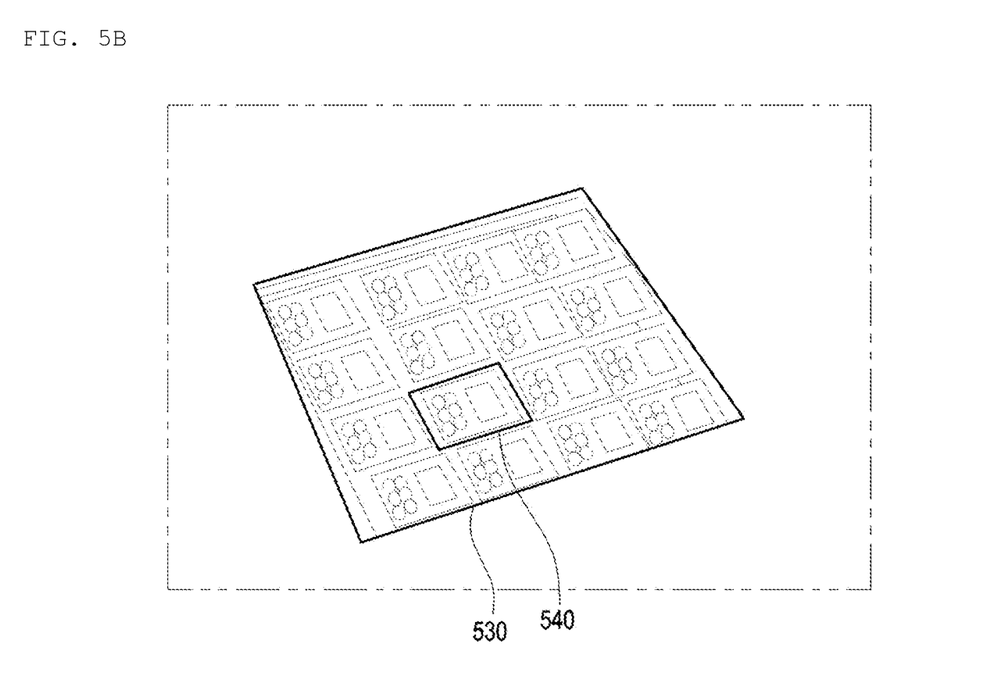
FIG. 5B illustratively shows how information on an interaction between a person and a product is estimated and the estimated information on the interaction is validated according to one embodiment of the invention.

Referring to FIGS. 5A and 5B, a first person 510, 520 detected in a video frame by the interaction information estimation unit 210 according to one embodiment of the invention, a position 550 of the detected first person's hand estimated from the first person, a product region 530, and a product 540 included in the product region are illustrated. According to one embodiment of the invention, the position 550 of the first person's hand is not included in the product region 530 in the video frame shown in FIG. 5A, and thus it may be determined that a relationship between the first person and the product region has not begun.

Figure 6:
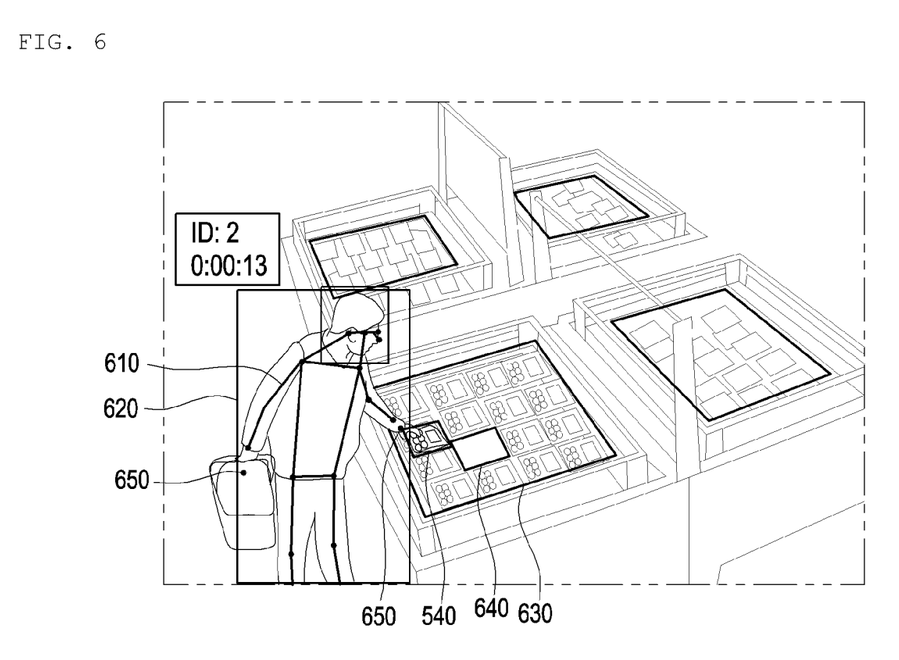
FIG. 6 illustratively shows how information on an interaction between a person and a product is estimated and the estimated information on the interaction is validated according to one embodiment of the invention.

Next, referring to FIG. 6, a first person 610, 620 detected in a video frame by the interaction information estimation unit 210 according to one embodiment of the invention, a position 650 of the detected first person's hand estimated from the first person, a product region 630, and a product 640 included in the product region are illustrated. According to one embodiment of the invention, the position 650 of the first person's hand is included in the product region 630 in the video frame shown in FIG. 6, and thus it may be determined that the relationship between the first person and the product region is maintained.

Figure 7A:
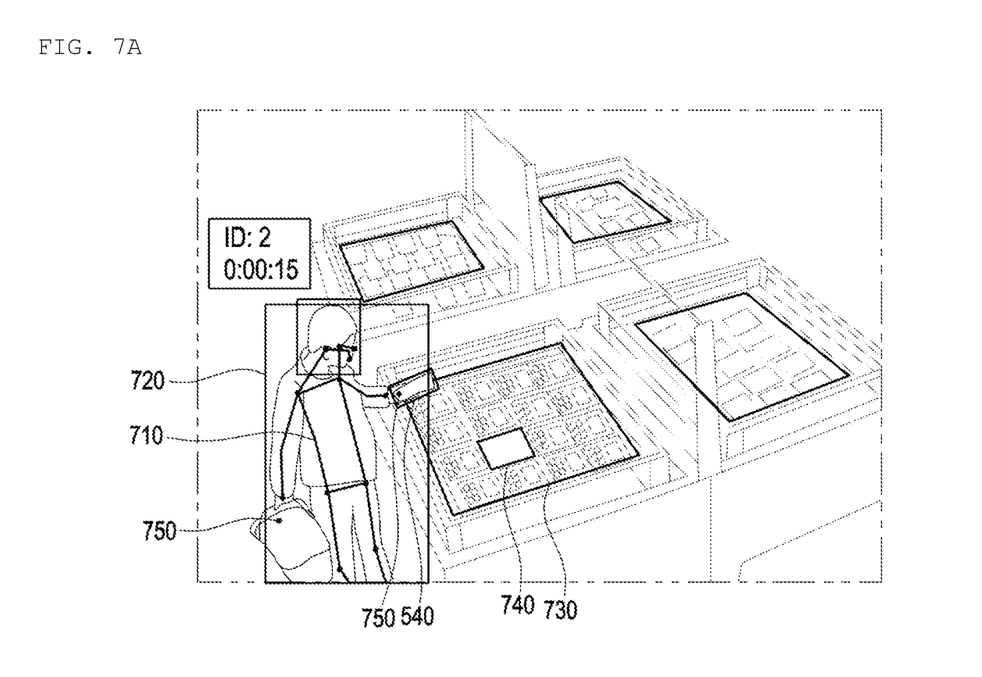
FIG. 7A illustratively shows how information on an interaction between a person and a product is estimated and the estimated information on the interaction is validated according to one embodiment of the invention.
Figure 7B:
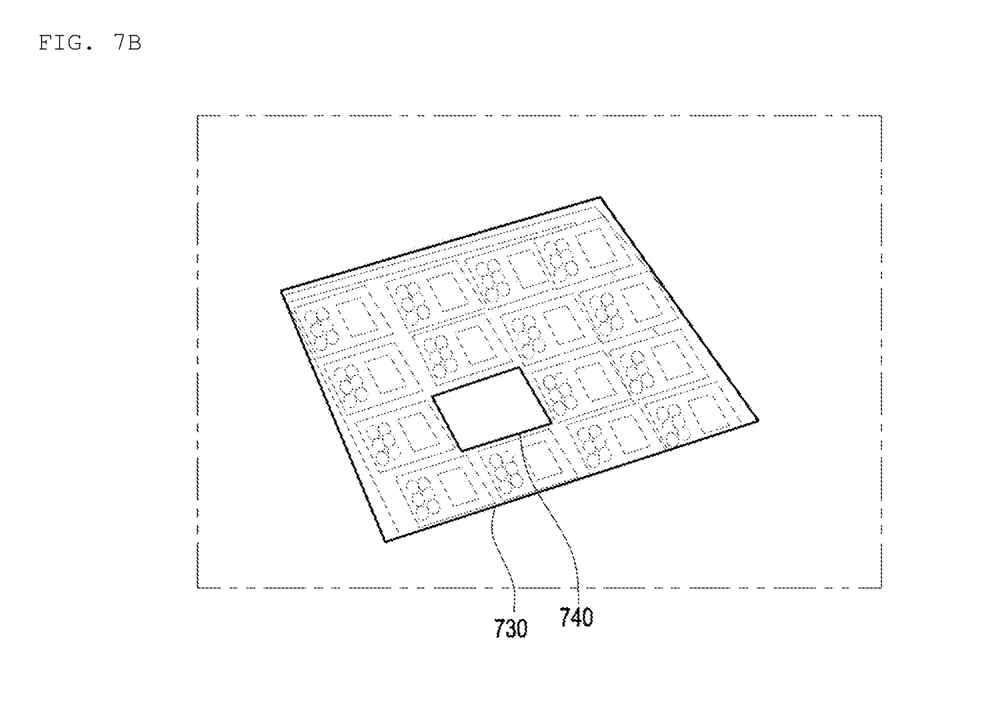
FIG. 7B illustratively shows how information on an interaction between a person and a product is estimated and the estimated information on the interaction is validated according to one embodiment of the invention.

Next, referring to FIGS. 7A and 7B, a first person 710, 720 detected in a video frame by the interaction information estimation unit 210 according to one embodiment of the invention, a position 750 of the detected first person's hand estimated from the first person, a product region 730, and a product 740 included in the product region are illustrated. According to one embodiment of the invention, the position 750 of the first person's hand is not included in the product region 730 in the video frame shown in FIG. 7A, and thus it may be determined that the relationship between the first person and the product region has ended.

Figure 8:
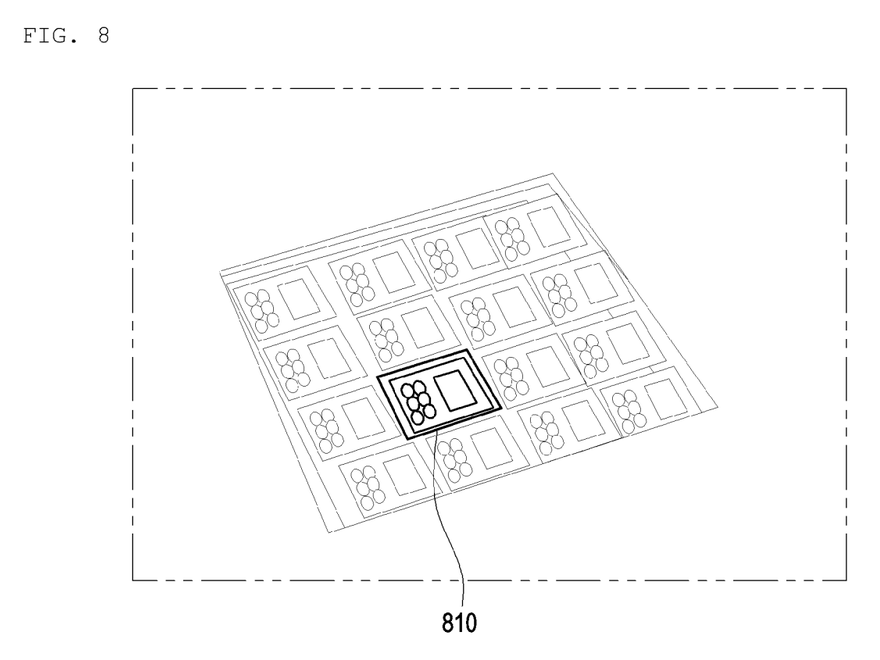
FIG. 8 illustratively shows how information on an interaction between a person and a product is estimated and the estimated information on the interaction is validated according to one embodiment of the invention.

Lastly, referring to FIG. 8, a portion 810 is visually represented whose pixel values are changed between the product region 530 (before the relationship between the first person and the product region begins) and the product region 730 (after the relationship between the first person and the product region ends).

Next, the communication unit 230 according to one embodiment of the invention may function to enable data transmission/reception from/to the interaction information estimation unit 210 and the validation unit 220.

Lastly, the control unit 240 according to one embodiment of the invention may function to control data flow among the interaction information estimation unit 210, the validation unit 220, and the communication unit 230. That is, the control unit 240 according to the invention may control data flow into/out of the interaction information estimation system 200 or data flow among the respective components of the interaction information estimation system 200, such that the interaction information estimation unit 210, the validation unit 220, and the communication unit 230 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

The recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for estimating information on an interaction between a person and a product on the basis of a video, the method comprising the steps of:

determining, on the basis of a relationship between a product region and a first person detected in a plurality of video frames, whether contact is made between the first person and a product included in the product region, thereby estimating information on an interaction between the first person and the product on the basis of a result of the determination; and validating the estimated information on the interaction with reference to at least one of a number of video frames between a first video frame in which the relationship between the product region and the detected first person begins and a second video frame in which the relationship between the product region and the detected first person ends, and a pixel value change between a third video frame temporally preceding the first video frame and a fourth video frame temporally trailing the second video frame.

2. The method of claim 1, wherein in the estimating step, whether the contact is made is determined on the basis of an extent to which the detected first person is included in the product region.

3. The method of claim 1, wherein in the estimating step, whether the contact is made is determined on the basis of a relationship between a position of the detected first person's hand estimated from the first person and the product region.

4. The method of claim 1, wherein in the estimating step, the information on the interaction is estimated on the basis of the first video frame and the second video frame.

5. The method of claim 4, wherein in the estimating step, the first video frame and the second video frame are determined on the basis of a relationship between a position of the detected first person's hand estimated from the first person and the product region.

6. The method of claim 1, wherein in the estimating step, when there are two or more pieces of the estimated information on the interaction, the estimated information on the interaction includes first interaction information and second interaction information, and a video frame that finishes a preceding section serving as a basis for the first interaction information temporally precedes a video frame that starts a trailing section serving as a basis for the second interaction information, and wherein the estimating step comprises the step of merging the first interaction information and the second interaction information on the basis of a number of video frames between the video frame that finishes the preceding section and the video frame that starts the trailing section.

7. The method of claim 1, wherein in the estimating step, whether the contact is made is determined without referring to depth information on the plurality of video frames.

8. A non-transitory computer-readable recording medium having stored thereon a computer program for executing the method of claim 1.

9. A system for estimating information on an interaction between a person and a product on the basis of a video, the system comprising:

an interaction information estimation unit configured to determine, on the basis of a relationship between a product region and a first person detected in a plurality of video frames, whether contact is made between the first person and a product included in the product region, thereby estimating information on an interaction between the first person and the product on the basis of a result of the determination; and a validation unit configured to validate the estimated information on the interaction with reference to at least one of a number of video frames between a first video frame in which the relationship between the product region and the detected first person begins and a second video frame in which the relationship between the product region and the detected first person ends, and a pixel value change between a third video frame temporally preceding the first video frame and a fourth video frame temporally trailing the second video frame.

* * * * *